United States Patent
Yoshimura et al.

(10) Patent No.: US 9,889,810 B2
(45) Date of Patent: Feb. 13, 2018

(54) UTILITY VEHICLE

(71) Applicant: KAWASAKI JUKOGYO KABUSHIKI KAISHA, Hyogo (JP)

(72) Inventors: Gaku Yoshimura, Hyogo (JP); Masayuki Shibata, Hyogo (JP)

(73) Assignee: KAWASAKI JUKOGYO KABUSHIKI KAISHA, Hyogo (JP)

( * ) Notice: Subject to any disclaimer, the term of this patent is extended or adjusted under 35 U.S.C. 154(b) by 0 days.

(21) Appl. No.: 15/162,938

(22) Filed: May 24, 2016

(65) Prior Publication Data

US 2017/0341614 A1   Nov. 30, 2017

(51) Int. Cl.
*B60R 21/13* (2006.01)
*B62D 33/06* (2006.01)
*B60R 21/00* (2006.01)

(52) U.S. Cl.
CPC ............ *B60R 21/13* (2013.01); *B60R 21/131* (2013.01); *B62D 33/0617* (2013.01); *B60R 2021/0018* (2013.01); *B60R 2021/0074* (2013.01)

(58) Field of Classification Search
CPC ........ B60R 21/11; B60R 21/13; B60R 21/131
USPC .................................................. 296/190.03
See application file for complete search history.

(56) References Cited

U.S. PATENT DOCUMENTS

| | | | | |
|---|---|---|---|---|
| 3,561,785 | A | * | 2/1971 | Kidder .................... B60R 21/11 280/756 |
| 4,973,082 | A | * | 11/1990 | Kincheloe ............... B60R 21/13 280/756 |
| 7,175,200 | B1 | * | 2/2007 | Obershan ................ B60R 21/13 280/755 |
| 7,708,105 | B1 | * | 5/2010 | Berg ..................... B62D 21/183 180/312 |
| 8,585,088 | B1 | | 11/2013 | Kaku et al. |
| 8,690,217 | B2 | | 4/2014 | Yamamoto et al. |
| 8,827,357 | B2 | | 9/2014 | Kaku et al. |
| 9,573,547 | B2 | * | 2/2017 | Friedeman .............. B60R 21/02 |
| 2006/0267379 | A1 | * | 11/2006 | Johnson .................... B60J 7/04 296/190.08 |
| 2016/0052582 | A1 | * | 2/2016 | Louisa ..................... B62J 17/00 296/190.03 |

* cited by examiner

*Primary Examiner* — Jason S Daniels
(74) *Attorney, Agent, or Firm* — Wenderoth, Lind & Ponack, L.L.P.

(57) ABSTRACT

A utility vehicle includes a chassis, and a ROPS provided on the chassis. The ROPS surrounds a cabin space of the vehicle. A center of gravity of the vehicle is located at a position of ⅓ or lower of the vehicle height, and an outline of the ROPS is formed in a curved shape when seen in the right and left direction or in the front and rear direction of the vehicle. Since the outline of the ROPS is formed in a curved shape, in the case of rollover of a vehicle body, the ROPS can easily roll on the ground surface. The combination of the configuration of the ROPS and the gravitational force exerted on the low position of the center of gravity, which is ⅓ or lower of the vehicle height, the vehicle body can be easily set up from the rolled over situation.

9 Claims, 4 Drawing Sheets

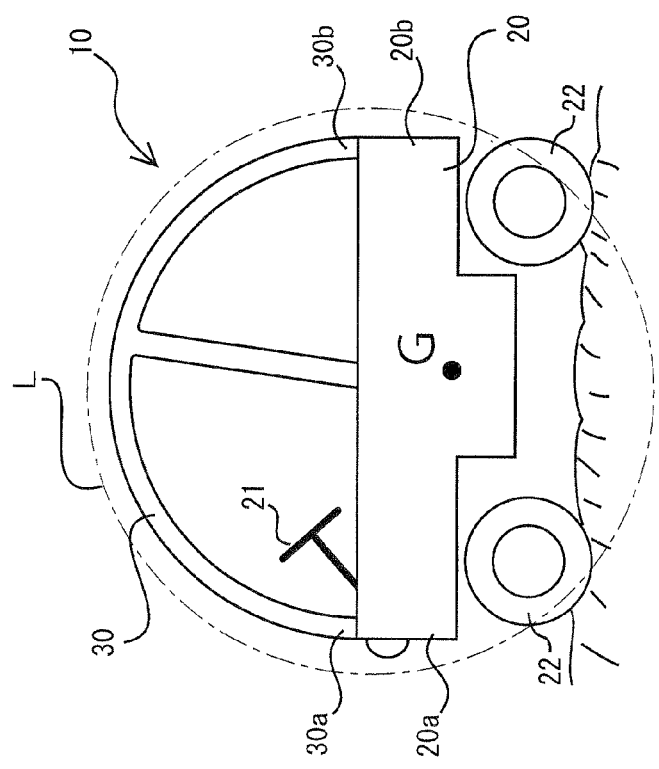
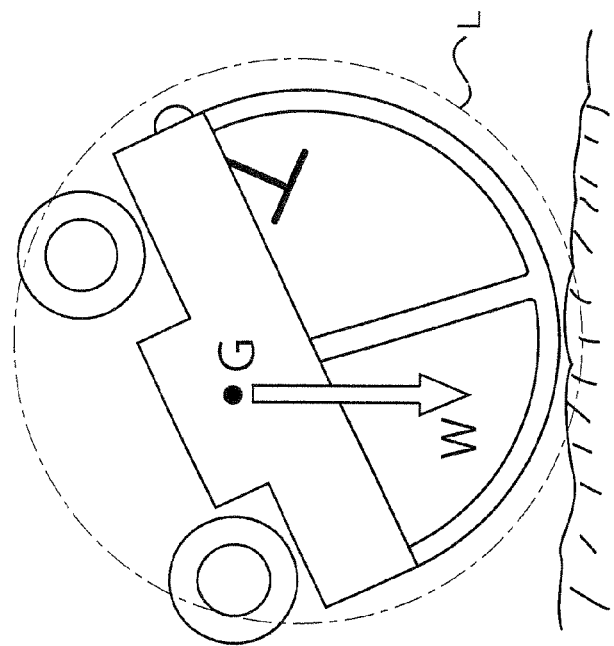
FIG. 1A
FIG. 1B

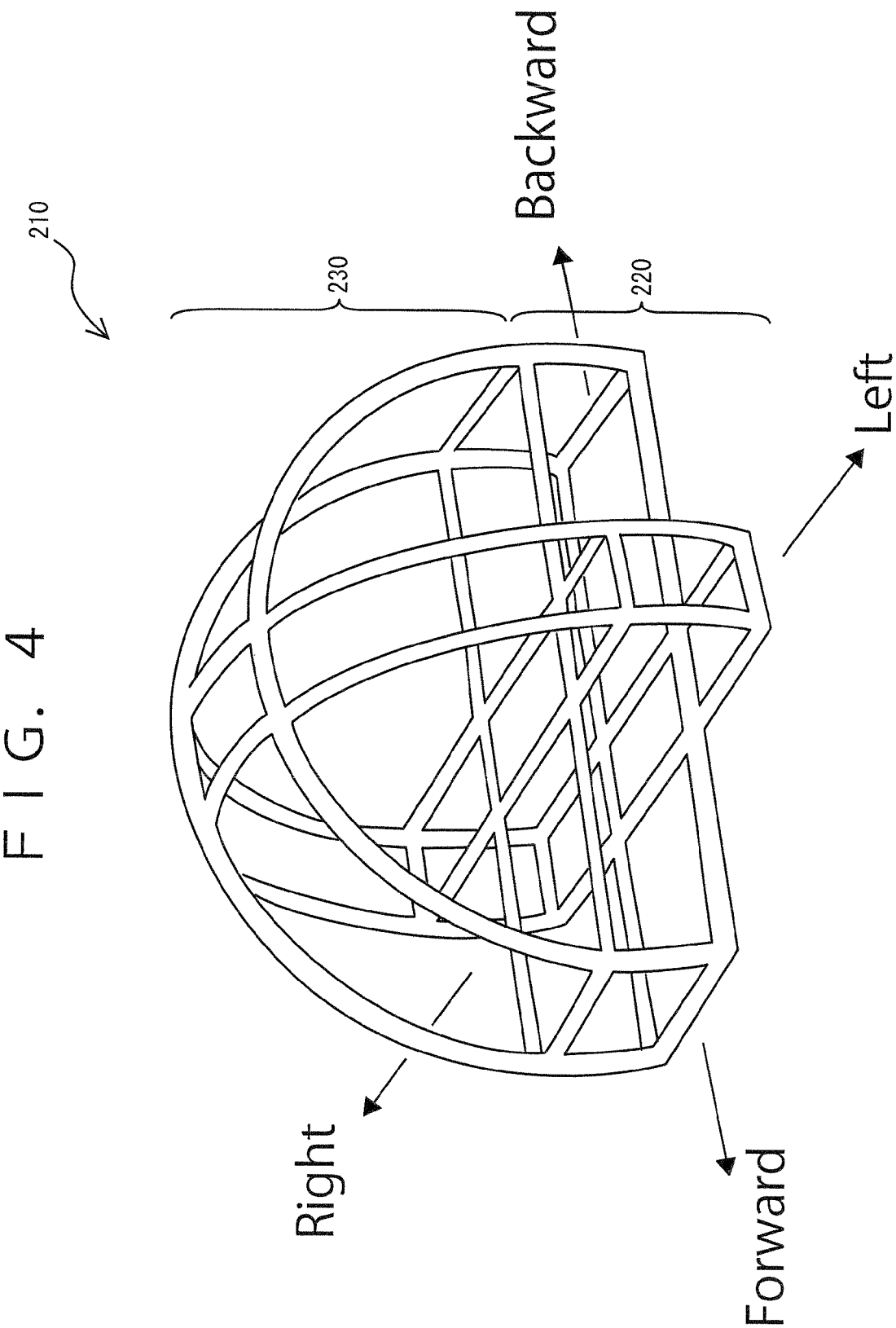
F I G. 4

UTILITY VEHICLE

BACKGROUND OF THE INVENTION

1. Field of the Invention

The present invention relates to a utility vehicle, and particularly relates to a shape of a ROPS for protecting a cabin space.

2. Description of the Prior Art

Utility vehicles are used for multiple purposes such as pasture management and agricultural work, and run through fields and mountains, wasteland, sloping land, and the like which are not paved.

In such utility vehicles, conventionally, a utility vehicle including a ROPS provided on a chassis for protecting a cabin space is proposed (for example, U.S. Pat. No. 8,585,088, U.S. Pat. No. 8,690,217, U.S. Pat. No. 8,827,357, and the like).

It should be noted that the ROPS (Rollover Protective Structure) means a framework having strength necessary for protecting the cabin space from an outside impact.

SUMMARY OF THE INVENTION

An object of the present invention is to provide a utility vehicle including a ROPS, in which a shape of the ROPS is improved so that the utility vehicle is easily set up in case of rolled over.

A utility vehicle of the present invention includes a chassis, and a ROPS provided on the chassis so as to surround the cabin space. A center of gravity of the utility vehicle is located at a position of ⅓ or lower of the vehicle height, and an outline of the ROPS is formed in a curved shape when seen in the right and left direction of the vehicle body.

According to another aspect of the present invention, an outline of the ROPS is formed in a curved shape when seen in the front and rear direction of vehicle body. According to still another aspect of the present invention, an outline of the ROPS is formed in a dome shape.

According to the utility vehicle of the present invention having the above configurations, since the outline of the ROPS is formed in a curved shape when seen in a horizontal direction (the right and left direction, the front and rear direction, the oblique direction, and the like of a vehicle body), the ROPS can easily roll on a ground surface, in the event that the vehicle is rolled over. Thanks to a combination of such configuration and assistance of gravitational force exerted on the center of gravity located ⅓ or lower of vehicle height, the rolled over vehicle can be easily set up (restored from a rolled over situation).

Even in case of a strong impact being exerted on the ROPS at the time of rollover or the like, since the outline of the ROPS is formed in a curved shape, the impact force is dispersed (without stress concentration). Thus, there is also the advantage that the ROPS is not easily deformed.

Regarding the outline shape of the ROPS in the present invention, the word "curved shape" means a shape appropriately curved in order to realize favorable rolling on the ground surface. Of course, the "curved shape" includes an arc shape with a fixed curvature, but is not limited to this. The word "curved shape" is a concept also including an oval and the like with non-fixed curvature. The "dome shape" means a shape, which corresponds to the above "curved shape" when the vehicle body is seen in the horizontal direction (the right and left direction, the front and rear direction, or the oblique direction).

In the present invention, the outline of the ROPS is formed in an arc shape, a curved shape, or a dome shape. Note that the entire ROPS may be formed by a seamless one-piece framework, or may be formed by appropriately coupling a plurality of frame members in an arc shape, a curved shape, or a dome shape.

BRIEF DESCRIPTION OF THE DRAWINGS

These and other objects and features of the present invention will become apparent from the following description taken in conjunction with the preferred embodiments thereof with reference to the accompanying drawings.

FIG. 1A is a view in which a utility vehicle according to a first embodiment of the present invention is seen in the right and left direction of a vehicle body.

FIG. 1B is a view showing a situation where the utility vehicle of FIG. 1A is rolled over.

FIG. 4 is a perspective view showing a framework of a utility vehicle according to a third embodiment of the present invention.

DETAILED DESCRIPTION OF THE PREFERRED EMBODIMENTS

First Embodiment

Figure 2B:
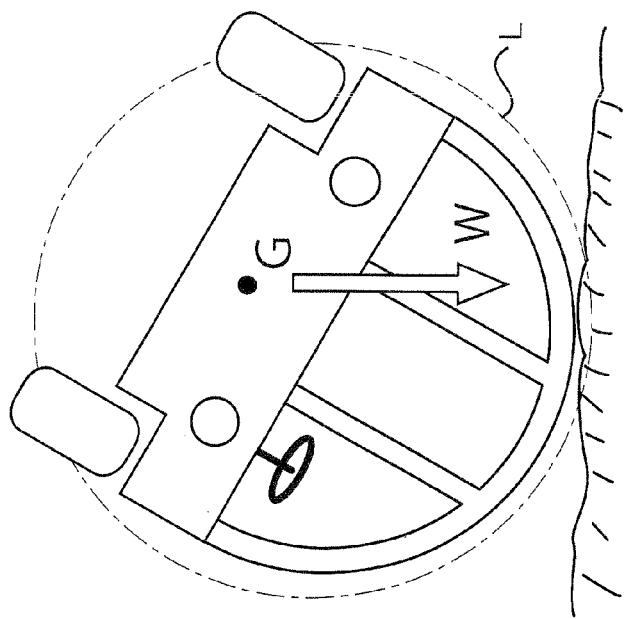
FIG. 2B is a view showing a situation where the utility vehicle of FIG. 2A is rolled over.

With reference to FIGS. 1A and 1B, a first embodiment of the present invention will be described. FIG. 1A is a side view in which a utility vehicle 10 according to the first embodiment is seen in the right and left direction of a vehicle body. The utility vehicle 10 runs leftward in FIG. 1A.

The utility vehicle 10 includes a ROPS 30 on an upper part of a chassis 20. The "ROPS (Rollover Protective Structure)" means a frame structure provided on the chassis 20 for protecting a cabin space from outside impacts. If necessary, some elements such as a windshield or the like can be attached to the ROPS 30, via an appropriate member such as a guide bar.

The "chassis" means a vehicle body framework other than the ROPS. A steering system from a steering wheel 21 to tires 22, a drive system from an accelerator to the tires 22 through an engine, a passenger seat, and the like are to be assembled to the chassis 20.

A feature of the present invention lies in the combination of the shape of the ROPS 30 and the position of the center of gravity of the utility vehicle. That is, as shown in FIG. 1A, when the utility vehicle 10 is seen in the right and left direction, an outline of the ROPS 30 is formed in an arc shape. The center of gravity "G" of the utility vehicle is located at a position of ⅓ or lower of the vehicle height.

With the utility vehicle 10 having the above configuration, even in the case of a rollover of the vehicle body, as shown in FIG. 1B, since the outline of the ROPS 30 on the vehicle body is formed in an arc shape, the rolled over vehicle body can be easily rolled, so that the vehicle body can be relatively easily set up (a vehicle body posture can be restored). Further, since the center of gravity "G" of the utility vehicle is located at the position of ⅓ or lower of the vehicle height (position near the bottom of the vehicle body), the gravitational force exerted in the direction of an arrow "W" can help restore the vehicle body posture.

An imaginary circle "L" in FIGS. 1A and 1B intuitively shows this. In the figures, the tires 22 partially come out of the imaginary circle "L". Thus, it is thought that, at the time of a task of setting up the rolled over vehicle body, the coming-out parts of the tires would lower efficiency of the task. For avoiding this, the entire tires 22 should be located inside the imaginary circle "L".

On the other hand, since the tires 22 partially come out of the imaginary circle L, there is an advantage that continuous rolling of the vehicle can be prevented, for example, on sloping land.

Theoretically, when the center of gravity "G" of the vehicle is located at a position lower than ½ of the vehicle height, there can be obtained some extent of the effect for restoring the vehicle body posture in the case of the rolled over vehicle. However, in practice, the effect is preferably enhanced by locating the center of gravity "G" at the position of ⅓ or lower of vehicle height. It should be noted that the center of gravity "G" should not be located higher than ½ of the vehicle height. This is because the gravitational force would keep the vehicle in a rolled over situation.

Further, since the outline of the ROPS 30 is formed in an arc shape, impact force at the time of rollover or the like is dispersed (without stress concentration). Thus, there is also an advantage that the ROPS 30 is not easily deformed.

In the first embodiment, it is sufficient if the outline of the ROPS 30 is formed in an arc shape when seen in the right and left direction of the vehicle body, and the shape, when seen in front and rear direction of the vehicle body, can be arbitrarily designed.

Second Embodiment

Figure 2A:
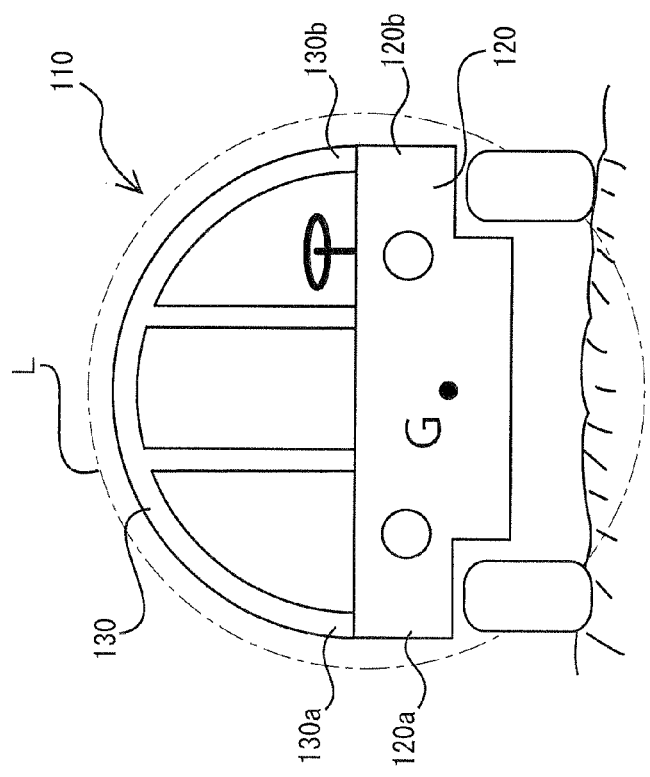
FIG. 2A is a view in which a utility vehicle according to a second embodiment of the present invention is seen in the front and rear direction of a vehicle body.

FIGS. 2A and 2B show a utility vehicle 110 according to a second embodiment of the present invention. In the first embodiment of FIGS. 1A and 1B, the outline of the ROPS 30 is formed in an arc shape when seen in the right and left direction of the vehicle body of the utility vehicle 10. However, in the utility vehicle 110 of the second embodiment, an outline of a ROPS 130 is formed in an arc shape when viewing the vehicle body in the front and rear direction.

Regarding the position of the center of gravity "G", it is located at a position of ⅓ or lower of the vehicle height, like in the first embodiment.

A mechanism (theory) that the rolled over vehicle is easily set up thanks to the combination of the shape of the ROPS and the position of the center of gravity "G" of the vehicle is the same as in the first embodiment. The expected rollover directions are different in the first embodiment and in the second embodiment. That is, in the first embodiment, the vehicle body is easily set up in the case of rollover in the running direction of the vehicle (FIG. 1B), and in the second embodiment, the vehicle body is easily set up in the case of rollover in the right and left direction of the vehicle body (FIG. 2B).

In the second embodiment, it is sufficient if the outline of the ROPS 130 is formed in an arc shape when seen in the front and rear direction of the vehicle body, and the shape when seen in the right and left direction of the vehicle body can be arbitrarily designed.

Variations of First and Second Embodiments (1) Relative Position of ROPS 30, 130 to Chassis 20, 120

Next, variations of the first embodiment and the second embodiment will be described. Each of FIGS. 3A to 3D conceptually shows the positional relationship between the chassis and the ROPS when the utility vehicle is seen in right and left direction (or in front and rear direction) of the vehicle body.

<FIG. 3A>

Regarding the first embodiment, in FIG. 1A, a foremost part 30*a* of the ROPS 30 in the front and rear direction of the vehicle body is positioned at the same position as a foremost part 20*a* of the chassis 20. Further, a rearmost part 30*b* of the ROPS 30 in the front and rear direction of the vehicle body is positioned at the same position as a rearmost part 20*b* of the chassis 20.

Figure 3A:
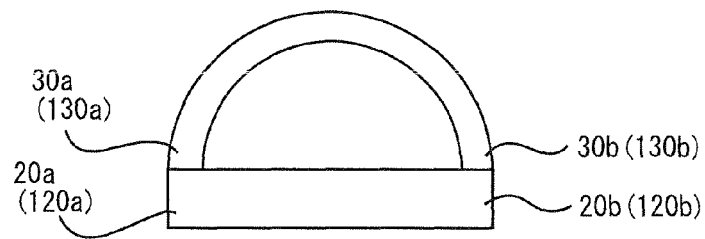
FIGS. 3A to 3D are views conceptually showing variations of the first embodiment and the second embodiment.

Regarding the second embodiment, in FIG. 2A, a rightmost part 130*a* of the ROPS 130 in the right and left direction of the vehicle body is positioned at the same position as a rightmost part 120*a* of the chassis 120. Further, a leftmost part 130*b* of the ROPS 130 in the right and left direction of the vehicle body is positioned at the same position as a leftmost part 120*b* of the chassis 120. FIG. 3A is what conceptually shows these facts in a simplified way.

<FIG. 3B>

Figure 3B:
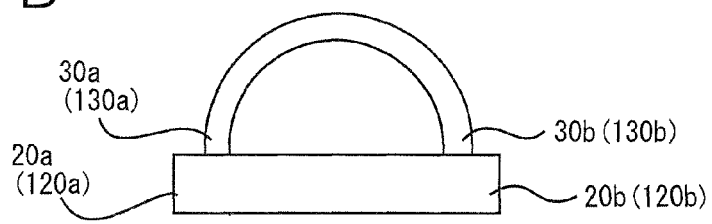

As shown in FIG. 3B, which is a variation of the first and second embodiments, even if the foremost part 30*a* of the ROPS 30 exists on the inner side of the foremost part 20*a* of the chassis 20, or the rearmost part 30*b* of the ROPS 30 exists on the inner side of the rearmost part 20*b* of the chassis 20, the vehicle body can be easily rolled in the case of vehicle roll over, such that the vehicle body could be easily set up, almost like in the case of FIG. 1A. This is because the outline of the ROPS 30 is formed in an arc shape.

Likewise, as shown in FIG. 3B in parentheses, even if the rightmost part 130*a* of the ROPS 130 exists on the inner side of the rightmost part 120*a* of the chassis 120, or the leftmost part 130*b* of the ROPS 130 exists on the inner side of the leftmost part 120*b* of the chassis 120, the vehicle body can be easily rolled, such that the vehicle body can be easily set up, almost like in the case of FIG. 2A. This is because the outline of the ROPS 130 is formed in an arc shape.

Figure 3C:
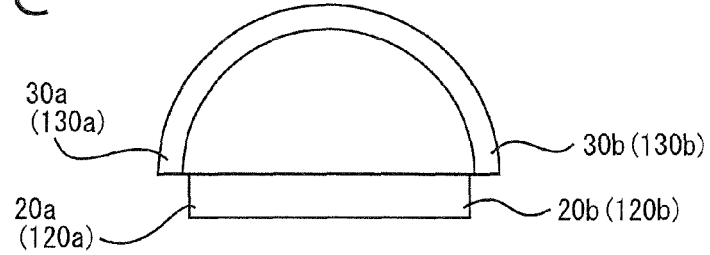
Figure 3D:
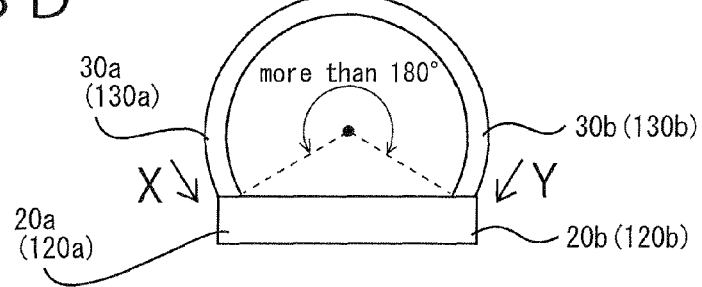

FIGS. 3C and 3D show further preferable variations.

<FIG. 3C>

In FIG. 3C, the foremost part 30*a* of the ROPS 30 is positioned at more front side than the foremost part 20*a* of the chassis 20. The rearmost part 30*b* of the ROPS 30 is positioned at more rear side than the rearmost part 20*b* of the chassis 20. With such a configuration, the front end 20*a* or the rear end 20*b* of the chassis will not prevent the vehicle body from rolling, and thus the rolled over vehicle body can be more easily set up.

It may be sufficient if at least one of the foremost part 30*a* and the rearmost part 30*b* of the ROPS 30 is in the positional relationship as shown in FIG. 3C, relative to the chassis 20.

Likewise, as shown in FIG. 3C in parentheses, the rightmost part 130*a* of the ROPS 130 is positioned at a more right outer side than the rightmost part 120*a* of the chassis 120. The leftmost part 130*b* of the ROPS 130 is positioned at a more left outer side than the leftmost part 120*b* of the chassis 120. With such the configuration, the rightmost part 120*a* or the leftmost part 120b of the chassis will not prevent the vehicle body from rolling, and thus the rolled over vehicle body can be more easily set up.

It may be sufficient if at least one of the rightmost part 130a and the leftmost part 130b of the ROPS 130 is in the positional relationship shown in FIG. 3C, relative to the chassis 120.

<FIG. 3D>

In FIG. 3D, the curved shape of the ROPS 30 extends further downward from the foremost part 30a while returning to the inner side of the vehicle body (arrow "X"), and likewise the curved shape of the ROPS 30 extends further downward from the rearmost part 30b while returning to the inner side of the vehicle body (arrow "Y"). With such a configuration, since the arc-shaped ROPS 30 broadly extends more than 180° of the center angle, the rolling nature of the rolled over vehicle body is further enhanced, such that the rolled over vehicle body can be even more easily set up.

It may be sufficient if at least one of the foremost part 30a and the rearmost part 30b of the ROPS 30 is in the positional relationship shown in FIG. 3D, relative to the chassis 20.

Likewise, as shown in FIG. 3D in parentheses, the curved shape of the ROPS 130 extends further downward from the rightmost part 130a while returning to the inner side of the vehicle body (arrow "X"), and likewise the curved shape of the ROPS 130 extends further downward from the leftmost part 130b while returning to the inner side of the vehicle body (arrow "Y"). With such a configuration, since the arc-shaped ROPS 130 broadly extends more than 180° of the center angle, the rolling nature of the rolled over vehicle body is further enhanced, such that the rolled over vehicle body can be even more easily set up.

It may be sufficient if at least one of the rightmost part 130a and the leftmost part 130b of the ROPS 130 is in the positional relationship shown in FIG. 3D, relative to the chassis 120.

(2) Position of Center of Gravity "G" of the Utility Vehicle

In the first embodiment and the second embodiment, the center of gravity "G" of the utility vehicle is located at the position of ⅓ or lower of the vehicle height. However, as well understood from FIGS. 1B and 2B (arrow "W"), in order to more easily set up the rolled over vehicle body, the lower position of the center of gravity "G" is preferable. That is, it would be preferable that the center of gravity is located as low as possible.

To lower the center of gravity, preferably, heavy items of the vehicle components are arranged as low as possible, or a posture of the engine in the vehicle body is determined so that the engine cylinders lie horizontally.

Third Embodiment

FIG. 4 shows only a framework 210 of a vehicle body, which is taken out from a utility vehicle according to a third embodiment of the present invention. The framework 210 integrally includes a chassis part 220 on the lower side and a ROPS part 230 on the upper side. The front and rear direction (that is, the forward and backward direction), and the right and left direction of vehicle body in the assembled utility vehicle are as shown in FIG. 4.

The framework 210 in the third embodiment is formed in a dome shape. That is, when seen in the right and left direction of the vehicle body, the framework 210 is formed in an arc shape, like in the first embodiment. When seen in the front and rear direction of the vehicle body, the framework 210 is formed in an arc shape, like in the second embodiment.

Therefore, the utility vehicle including this framework 210 could be easily set up in both cases of rollover in the front and rear direction, and of rollover in the right and left direction. In case of a rollover in the front and rear direction, the utility vehicle can be easily set up, like in the first embodiment (FIGS. 1A and 1B), and in the case of rollover in the right and left direction, the utility vehicle can be easily set up, like in the second embodiment (FIGS. 2A and 2B). Even in the case of rollover in an oblique direction (for example 45°), the rolled over utility vehicle can be easily set up, almost like in the case of rollover in the front and rear direction or the right and left direction, although the ease of setting up may be somewhat inferior.

By increasing the number of framework members forming the framework 210 of FIG. 4, facilitating rolling to restore the posture of the vehicle body in the case of rollover could be obtained, for any directions of 360°.

Other Embodiment (1) Curvature of ROPS

In the first to third embodiments, the outline of the ROPS is formed in an arc shape, when seen in the horizontal direction (seen in the front and rear direction, the right and left direction, or the oblique direction). Thereby, the rolled over vehicle can be easily set up.

In the present invention, the ROPS is not necessarily formed in an arc shape (with a fixed curvature) but may be formed in a curved shape, with which the nature of rolling on the ground surface can be obtained, when the utility vehicle is rolled over. The curvature may be varied from place to place on the ROPS (for example, the ROPS may be formed in the shape of an oval).

(2) Coupling Manner of Frame Members Forming ROPS

In the embodiments described and shown in the figures, the ROPS is drawn as a seamless one-piece framework. The present invention is not limited to this configuration. The ROPS may be formed by appropriately coupling a plurality of frame members, in an arc shape, a curved shape, or a dome shape.

Although the present invention has been fully described in connection with preferred embodiments thereof with reference to the accompanying drawings, it is to be noted that various changes and modifications will be apparent to those skilled in the art. Such changes and modifications are to be understood as included within the scope of the present invention as defined by the appended claims unless they depart therefrom.

What is claimed is:

1. A utility vehicle comprising:
   a chassis; and
   a rollover protective structure (ROPS) provided on the chassis, the ROPS surrounding a cabin space,
   wherein a center of gravity of the utility vehicle is located at a position of ⅓ or lower of vehicle height; and
   an outline of the ROPS is formed in a fixed curvature arc over its length when seen in a right and left direction of vehicle body.

2. The utility vehicle according to claim 1, wherein:
   a foremost part of the ROPS in a front and rear direction of the vehicle body is positioned at a more front side than a foremost part of the chassis; and/or a rearmost part of the ROPS in the front and rear direction of the vehicle body is positioned at a more rear side than a rearmost part of the chassis.

3. The utility vehicle according to claim 2, wherein the fixed curvature arc of the ROPS extends further downward from the foremost part and/or the rearmost part of the ROPS, while returning to an inner side of the vehicle body from the foremost part and/or the rearmost part of the ROPS.

4. A utility vehicle comprising:
a chassis; and
a rollover protective structure (ROPS) provided on the chassis, the ROPS surrounding a cabin space, wherein:
a center of gravity of the utility vehicle is located at a position of ⅓ or lower of vehicle height; and
an outline of the ROPS is formed in a fixed curvature arc over its length when seen in a front and rear direction of vehicle body.

5. The utility vehicle according to claim 4, wherein:
a leftmost part of the ROPS in a right and left direction of the vehicle body is positioned at a more left outer side than a leftmost part of the chassis; and/or
a rightmost part of the ROPS in the right and left direction of the vehicle body is positioned at a more right outer side than a rightmost part of the chassis.

6. The utility vehicle according to claim 5, wherein the fixed curvature arc of the ROPS extends further downward from the leftmost part and/or the rightmost part of the ROPS, while returning to an inner side of the vehicle body from the leftmost part and/or the rightmost part of the ROPS.

7. A utility vehicle comprising:
a chassis; and
a rollover protective structure (ROPS) provided on the chassis, the ROPS surrounding a cabin space, wherein:
a center of gravity of the utility vehicle is located at a position of ⅓ or lower of vehicle height, and
an outline of the ROPS is formed in a dome shape, the dome shape having a fixed curvature arc over its length when seen in a right and left direction of vehicle body, and a fixed curvature arc over its length when seen in a front and rear direction of vehicle body.

8. The utility vehicle according to claim 7, wherein:
a foremost part of the ROPS in the front and rear direction of vehicle body is positioned at a more front side than a foremost part of the chassis, and a rearmost part of the ROPS in the front and rear direction of vehicle body is positioned at a more rear side than a rearmost part of the chassis, and
a leftmost part of the ROPS in the right and left direction of vehicle body is positioned at a more left outer side than a leftmost part of the chassis, and a rightmost part of the ROPS in the right and left direction of vehicle body is positioned at a more right outer side than a rightmost part of the chassis.

9. The utility vehicle according to claim 8, wherein the dome shape of the ROPS extends further downward from the foremost part, the rearmost part, the leftmost part, and the rightmost part of the ROPS, while returning to an inner side of the vehicle body from the foremost part, the rearmost part, the leftmost part, and the rightmost part of the ROPS.

* * * * *